United States Patent [19]
Spencer

[11] Patent Number: 5,130,814
[45] Date of Patent: Jul. 14, 1992

[54] VIDEO RECORDING AND REPRODUCING APPARATUS INCLUDING DUAL OFFSET CCD IMAGE ARRAYS

[75] Inventor: Simon H. Spencer, Essex, United Kingdom

[73] Assignee: GECMarconi Limited, Essex, England

[21] Appl. No.: 450,978

[22] Filed: Dec. 15, 1989

[30] Foreign Application Priority Data

Dec. 23, 1988 [GB] United Kingdom ............. 8830098

[51] Int. Cl.⁵ .............................................. H04N 5/76
[52] U.S. Cl. ............................ 358/335; 358/213.27; 358/213.28
[58] Field of Search ........... 358/335, 310, 209, 213.11, 358/213.13, 213.22, 213.27, 213.28

[56] References Cited

U.S. PATENT DOCUMENTS

| | | | |
|---|---|---|---|
| 3,975,760 | 8/1976 | Yamanaka et al. | 358/41 |
| 4,432,017 | 2/1984 | Stoffel et al. | 358/213.26 |
| 4,438,457 | 3/1984 | Tandon et al. | 358/213.26 |
| 4,765,564 | 8/1988 | Colvocoresses | 244/3.16 |
| 4,794,457 | 12/1988 | Gillet et al. | 358/162 |

FOREIGN PATENT DOCUMENTS 2048609 12/1980 United Kingdom.

*Primary Examiner*—Robert L. Richardson
*Attorney, Agent, or Firm*—Lowe, Price, LeBlanc & Becker

[57] ABSTRACT

A Television camera uses a pair of CCD imaging sensors (CCDA, CCDB), which are offset by half a pixel horizontally and one television line vertically and a beam splitter for focusing radiation from a scene to be imaged onto both imagers simultaneously. The outputs of the two imagers are digitized and combined at a compressed rate for recording on a digital cassette recorder. Signals may be read out from the cassette recorder at a quarter the rate they were input and subsequently processed to obtain a higher resolution, high speed image of the non-interlaced kind. The invention may be applied in the field of high definition television.

9 Claims, 4 Drawing Sheets

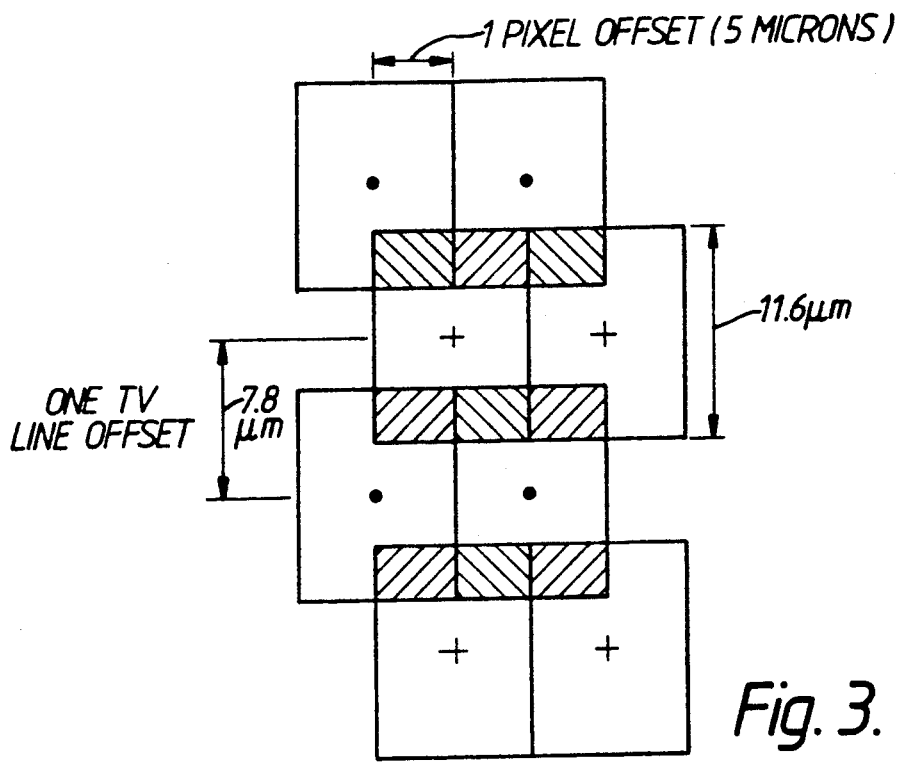

VIDEO RECORDING AND REPRODUCING APPARATUS INCLUDING DUAL OFFSET CCD IMAGE ARRAYS

BACKGROUND OF INVENTION

This invention relates to video recording and reproducing apparatus and in particular it relates to a high resolution, high speed recording and reproducing apparatus which uses a solid state imaging sensor for the generation of television signals.

The resolution and speeds required for television cameras are ever increasing. This can pose great problems for conventional technology and normally a trade-off is made between circuit complexity and resolution/speed. In particular, in conventional techniques problems are met when dealing with the very high bandwidth required and the difficulties of recording and displaying video signals at such high frequencies. The present invention arose in an effort to achieve such a high resolution, high speed system and also one in which interlacing is not required to achieve high resolution, although the invention is not limited to non-interlaced systems.

BRIEF SUMMARY OF THE INVENTION

According to the present invention there is provided video apparatus comprising a camera having a beam splitter for focusing radiation, from a scene to be imaged, simultaneously onto two solid state-imagers, one imager being offset by half a pixel in one direction and one television line in an orthogonal direction, and means for combining the outputs from the two imagers to produce a single image of the scene.

Preferably, the outputs from the imagers are digitised and compressed. Line blanking periods may be removed before the information is digitally stored in, for example, a digital cassette recorder.

A reproduction means may be used in which information is read out from the recorder at a reduced rate which is preferably one quarter the rate at which it was input.

In order to further increase resolution, the reproduction means may include means for delaying selected portions of selected frequency bands of the signal by selected amounts. This means preferably comprises means for delaying signals representative of alternate pixels of the information in a chosen high frequency band by one line period and means for delaying all information of frequency less than the high frequency band by one line period.

The resulting information after appropriate delays can be combined and alternate lines delayed by half a pixel period.

BRIEF DESCRIPTION OF THE DRAWING

Embodiments of the invention will now be described, by way of example only, with reference to the accompanying drawings in which.

DESCRIPTION OF PREFERRED EMBODIMENT

Figure 1:
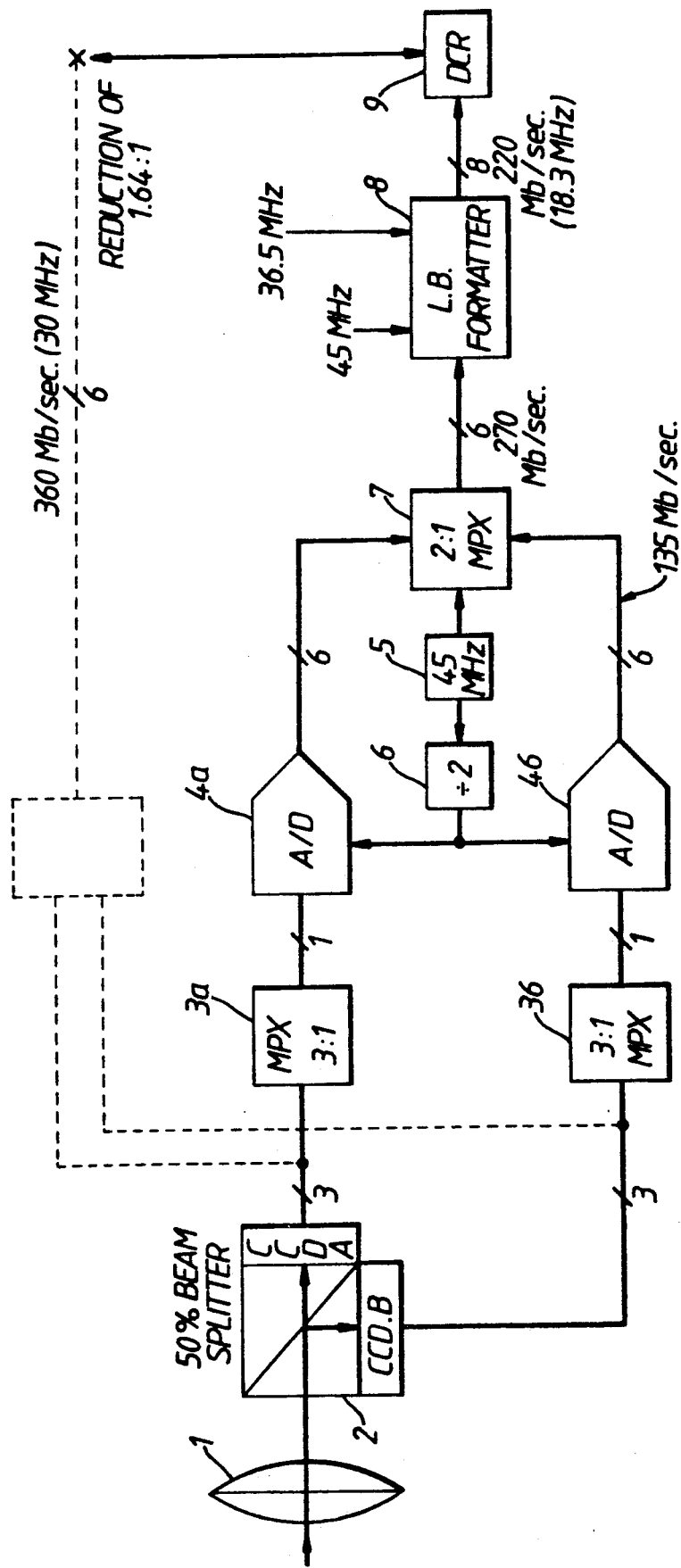
FIG. 1 shows schematically the elements of a video camera.

Referring to FIG. 1 a television camera comprises a focusing lens 1 which directs radiation from a scene to be imaged onto a beam splitter 2. The lens and beam splitter serve to focus the radiation onto two CCD imaging arrays, CCDA and CCDB, which are offset relative to one another by half a pixel horizontally and by one television line in the vertical direction. This is shown in FIG. 3. It is seen from FIG. 3 that the CCD's used are of the type which do not have a dead band between adjacent horizontal elements and which have a spacing of less than one line width between adjacent rows of elements, thus; if super-imposed, there will be some degree of overlap as shown by the shading on FIG. 3. The CCD's are of the three phase output types such as Philips three phase or Texas Instruments three phase devices. Since these are three phase devices then they can be scanned at one third the rate normally associated with a single phase output device and thus a higher overall scan rate can be achieved. The three outputs from each respective CCD are fed to a respective one of two multiplexers 3a and 3b where they are combined to produce a respective single phase output signal which is fed to a respective one of two analogue-to-digital converters 4a and 4b. These are 6 bit converters and are arranged to sample at a frequency of 22.5 MHz, which is derived from a 45 MHz generator 5 and divide by two unit 6.

The two 6-bit data lines from the respective A to D converters are combined by a two-to-one multiplexer 7 which is also fed from the 45 MHz generator 5. Since the frequency of the signals from the A to D converters was 135 Mb/sec then the output frequency from multiplexer 7 is 270 Mb/sec. Multiplexer 7 combines the odd TV lines from CCDA with the even lines of CCDB to produce a complete television picture (generally of 576 TV lines). In order to reduce the bandwidth it is convenient at this point to remove the normal line blanking period which is present on any television signal and generally comprises around 20% of the signal. This is achieved by a line blanking formatter 8 which serves to expand the active video information part of each line so as to encroach into the line blanking period. Since the information is expanded it is clear that the rate of information emerging from the formatter is reduced, as each piece of information can be conceptually viewed as being a little further apart from its neighbours than before. Thus the output rate from formatter 8 is 220 Mb/sec corresponding to a bandwidth of 18.3 MHz. It should be noted that it is also possible to remove the field blanking period and the signal may be reduced down to 203 Mb/sec which corresponds to a bandwidth of 17 MHz. The signal from the formatter is output in an 8-bit format where it can be applied directly to a digital recorder such as digital cassette recorder (DCR) 9. The dotted lines in FIG. 1 show how if the output from both CCD sensors A and B were combined directly in the conventional manner then a video bandwidth of 30 MHz, corresponding to a bit rate of 360 Mb/sec would be produced since 360 Mb/sec is 6-bit quantised with a pixel clock of two times 30 MHz. Thus, the compression system of the present apparatus involves a reduction of 1.64:1 in bandwidth.

Figure 2:
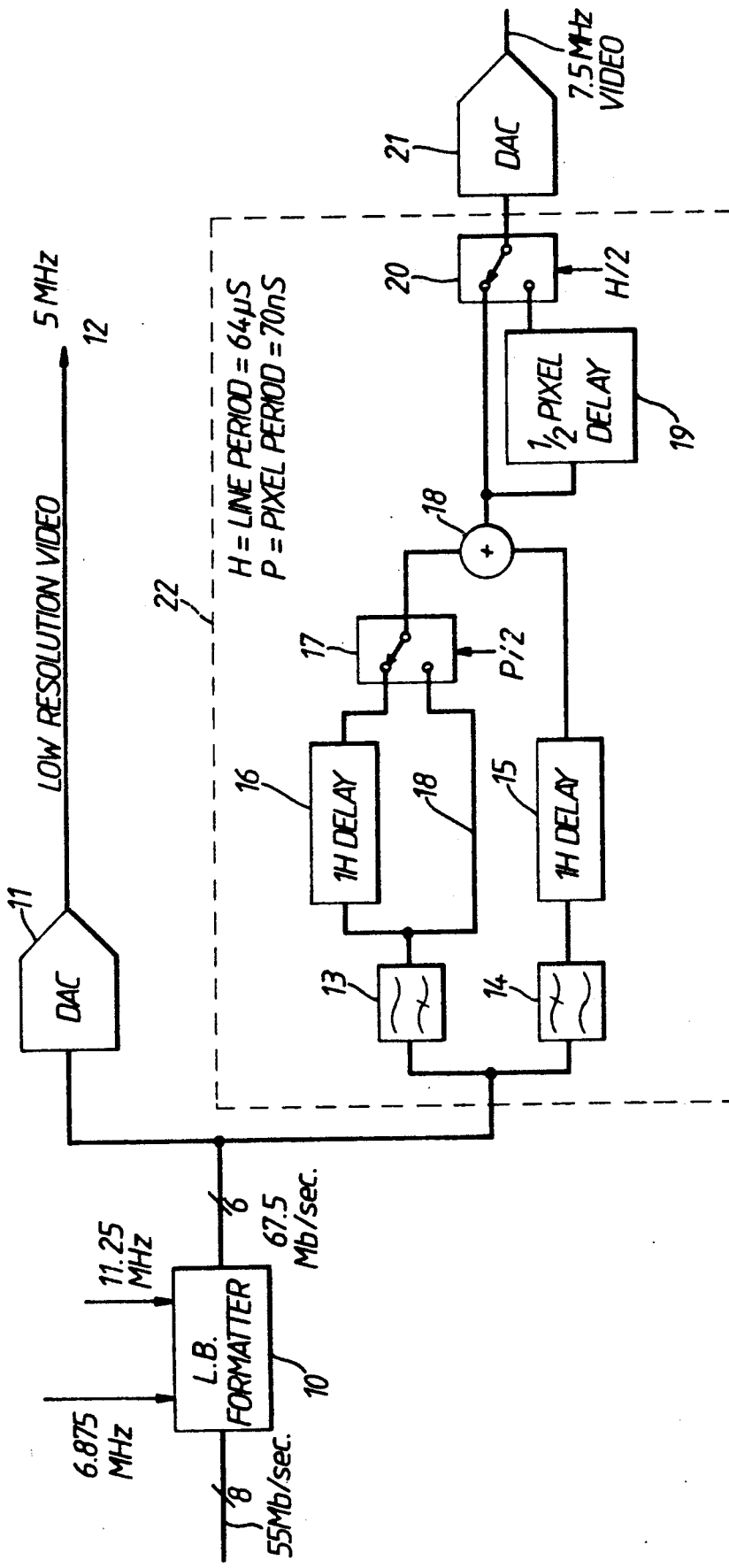
FIG. 2 shows a picture recovery apparatus for processing images recorded with the camera of FIG. 1, and FIGS. 3, 4(a)–4(c) and 5(a) and 5(b) are explanatory diagrams.

FIG. 2 shows apparatus suitable for replaying data from the digital recorder and converting it to a standard video format for TV display presentation. The signal from the digital recorder is output over an 8-bit line, at a rate which is one quarter of the rate it was input at ie. 55 Mb/sec to a line blanking formatter 10 which reintroduces the line blanking by compressing the data and hence increases the data rate to 67.5 Mb/sec in a 6-bit format. At this point it is possible to convert directly to analogue form by digital to analogue converter 11 and it may be useful to do this for test monitoring since a picture will be produced, but the picture will be of low resolution. This is shown as the 5 MHz signal at 12.

Referring briefly to FIGS. 3 and 4 it is seen that the image is spatially collected by the two CCD arrays A and B in the form shown in FIG. 4A. The signal is actually recorded by the digital cassette recorder (DCR) in the form shown in FIG. 4B. In order to achieve high resolution and high speed and signal is required to be output on the final television display in the form shown in FIG. 4C. This is achieved by the box 22 shown in dashed lines in FIG. 2. In order to expand the resolution from the 2×4 version shown in FIG. 4B to the 4×4 of FIG. 4C, without degrading the vertical resolution, it is necessary to separate the signal into low and high frequency components. This is achieved by respective high pass and low pass filters 13 and 14 of FIG. 2. The filters are chosen to have a symmetrical cross-over characteristic, ie., 50% 1 MHz and to be of low order form such as a single pole network. The low frequency portion, separated out by filter 14 is fed through a single one television line period delay network 15. Simultaneously, the high frequency portion from filter 13 is alternately fed by a switch 17 through a one line period delay 16 and a through line 18. The switch is arranged to actuate every other half pixel period (P/2). This process serves to double the number of pixels of the high frequency information. The low frequency information is all delayed by one line period so as to retain full vertical resolution of the system. The high frequency and low frequency signals are subsequently added together at 18 and passed through a half pixel delay 19 on alternate lines determined by a switch 20. Thus the signal lines 2, 4 etc. are delayed by half pixel periods. Digital-to-analogue conversion now takes place at converter 21 and the final video wave form, now at 7.5 MHz is output to a TV display or perhaps to a conventional video recorder. The signal is in the form shown in FIG. 4C which is shown to have high resolution in both the vertical and horizontal directions. A simple analysis of the system will reveal that the display is as shown in FIG. 4C in which those symbols with a cross through them are those which have been generated by the one line period delay line and in which those pixels on alternate lines are delayed by half a pixel.

It is seen from the above that high vertical and horizontal resolution is achieved using a non-interlaced camera, i.e. one in which a whole image is received during one frame. The prism used in FIG. 1 enables a reduction of two-to-one to be made in the speed of the pixel clock since two sensors are read out in parallel. This also enables data and bandwidth compression to be achieved. Furthermore, the final image produced is not a synthetic representation but is an accurate representation of the image at higher resolution due to the fact that the frame transfer images used have overlapping pixels. It is preferable to use CCD sensors of the type which do not have dead bands between pixels, such as interline transfer devices.

The system can be extended to produce a color camera using only two CCD sensors. In one example CCDA is a color stripped CCD with a spatial filter such as a Savart's plate and CCDB is a monochrome CCD.

It is believed that high definition television (HDTV) standards favour a system which has twice the vertical and horizontal resolution of a conventional 625 or 525 systems and an aspect ratio of 5/3, compared to one of 4/3 for present day systems. This can be achieved using the techniques of the present invention by the use of two CCD sensors of 626 or 525 lines which are offset by 10% and half pixel to achieve the desired 5-3 aspect ratio. This approach is also useful for color transmission by offsetting by 10% and 1½ pixels (i.e. half the color pitch of 3 pixels). The vertical inter-sensor spacing is as described above but, in order to achieve higher vertical resolution of more than 576 lines, interlace may need to be re-introduced and the cell structure changed.

Figure 5A:
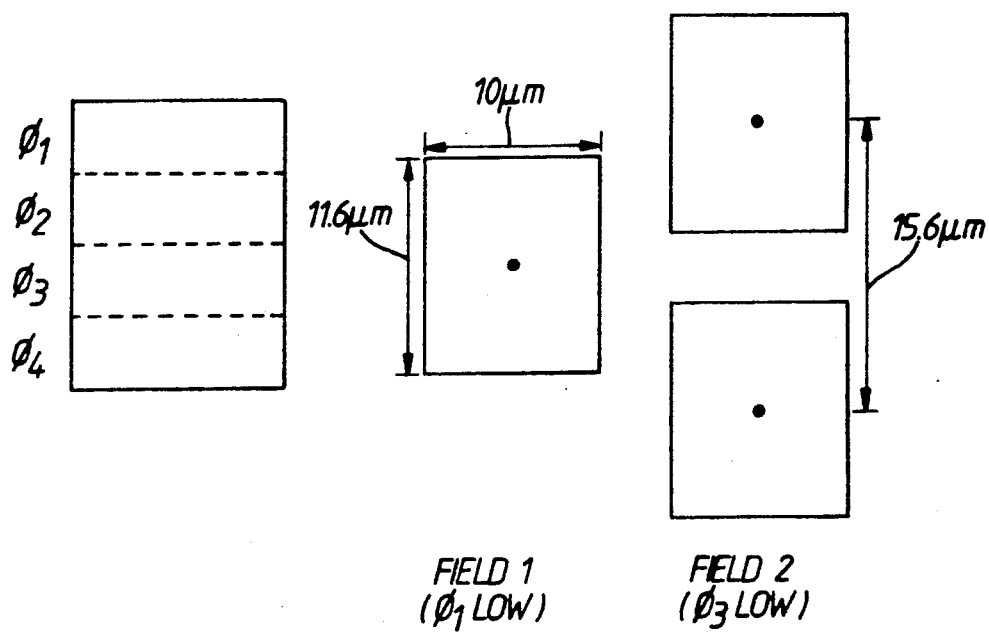

FIG. 5(a) illustrates how a CCD which has four imaging phases, such as Philips 4 phase 625 CCD sensors or certain types of 525 frame transfer devices, alternates its effective line position during a two field (2:1) interlace sequence between fields one and two.

Figure 5B:
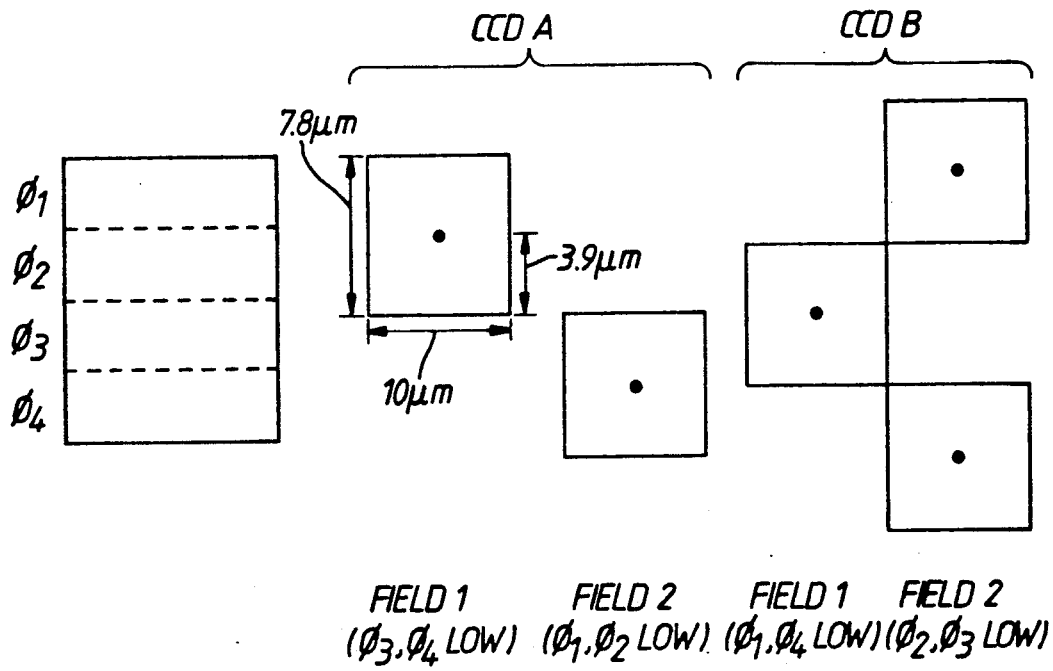

When two sensors are used for HDTV the cell height has to be reduced from 11.6 $\mu$m to 7.8 $\mu$m. FIG. 5(b) shows how the outputs from the two CCD arrays A and B are interlaced over four fields. It is seen that there is still an overlap of CCD A and B on the same field and that both sensors shift their effective line position by 3.8 $\mu$m (For a conventional single sensor camera with normal interlace this could be 7.8 $\mu$m).

Such as arrangement yields a virtual resolution of 768 TV lines compared to 576 TV lines without interlace. (For a single sensor this would be 400 TV lines). A further extension of this principle involves a four field (4:1) interlace sequence and a consequential reduction of cell height to only 3.1 $\mu$m.

We claim:

1. A video apparatus comprising:

a camera having a beam splitter for focusing radiation, from a scene to be imaged, simultaneously onto two solid state imagers which produce outputs representative of said radiation focussed thereon, one imager being offset by half a pixel in one direction and one television line in an orthogonal direction;

combining means for combining said outputs from said two imagers to produce an image of said scene; and analogue-to-digital converter means receiving said outputs from each imager for supplying a digital video signal to said combining means, said combining means comprising means for combining said digital video signals from said analogue-to-digital converter means, compressing the combined digital video signals and providing said compressed combined digital video signal at an output node.

2. A video apparatus comprising:

a camera having a beam splitter for focusing radiation, from a scene to be imaged, simultaneously onto two solid state imagers which produce outputs representative of said radiation focussed thereon, one imager being offset by half a pixel in one direction and one television line in an orthogonal direction;

combining means for combining said outputs from said two imagers to produce a video signal of said scene, said video signal including a plurality of sequential fields of data, each of said fields including a plurality of lines of video information and field blanking periods; and means for removing from said video signal at least one of (i) a portion of a line of video information, (ii) a field blanking period of each line of video information, and (iii) a field of data.

3. A video apparatus comprising:

a camera having a beam splitter for focusing radiation, from a scene to be imaged, simultaneously onto two solid state imagers which produce outputs representative of said radiation focussed thereon, one imager being offset by half a pixel in one direction and one television line in an orthogonal direction;

combining means for combining said outputs from said two imagers to produce an image of said scene;

digital recording means for recording said image; and reproduction means including reading means for reading data out of said recording means at an output rate which is less than an input rate at which said data is input and providing said read data as a video output signal.

4. The apparatus as claimed in claim 3 wherein said output rate is one quarter of said input rate.

5. The apparatus as claimed in claim 3 wherein said reproduction means includes means for reformatting said data read from said recording means by inserting into said data at least one of (i) said television lines; and (ii) field blanking period.

6. The apparatus as claimed in claim 3 wherein said reproduction means includes delaying means for delaying selected portions of selected frequencies of said video output signal by selected amounts.

7. The apparatus as claimed in claim 6 wherein said selected portions of said video output signal contain data of alternate pixels of information in a chosen high frequency band, said selected portions being delayed by said delaying means by one television line period.

8. The apparatus as claimed in claim 7 including means for delaying all information of a frequency less than said high frequency band by one television line period.

9. The apparatus as claimed in claim 8 including means for combining said information read from said recording means, and delaying alternate lines of said combined information by half a pixel period.

* * * * *